United States Patent [19]

Fransson et al.

[11] 4,427,324

[45] Jan. 24, 1984

[54] METHOD OF SHAPE GENERATION BY ORBITING A ROTATING HOB

[75] Inventors: George E. Fransson; Stuart J. Johnson; Edward W. Haug, all of Rockford, Ill.

[73] Assignee: Barber-Colman Company, Rockford, Ill.

[21] Appl. No.: 412,639

[22] Filed: Aug. 30, 1982

Related U.S. Application Data

[63] Continuation of Ser. No. 41,680, May 23, 1979, abandoned.

[51] Int. Cl.[3] .......................... B23F 5/22; B23F 15/02
[52] U.S. Cl. ........................................ 409/12; 51/90; 409/74
[58] Field of Search .................. 409/2, 11, 12, 14, 66, 409/74, 75, 78; 144/28.7, 28.71; 408/126; 51/90, 241 B, 289 R

[56] References Cited

U.S. PATENT DOCUMENTS

| | | | |
|---|---|---|---|
| 1,269,857 | 6/1918 | Richards | 409/66 |
| 1,386,279 | 8/1921 | Richards et al. | 409/66 |
| 3,224,146 | 12/1965 | Ahlstrom | 51/90 |
| 3,301,134 | 1/1967 | Daniel | 409/14 |
| 3,304,661 | 2/1967 | Maguire | 51/241 B X |
| 3,841,198 | 10/1974 | Cornford | 409/2 |
| 4,054,164 | 10/1977 | Kose et al. | 144/28.7 |
| 4,060,334 | 11/1977 | Wagner | 408/126 |

*Primary Examiner*—Z. R. Bilinsky
*Attorney, Agent, or Firm*—Robert M. Hammes, Jr.

[57] ABSTRACT

A method for generating a shape on the periphery of a non-rotating workpiece by orbiting a rotating hob in cutting engagement with the workpiece while moving the hob and workpiece relatively lengthwise of the workpiece.

8 Claims, 17 Drawing Figures

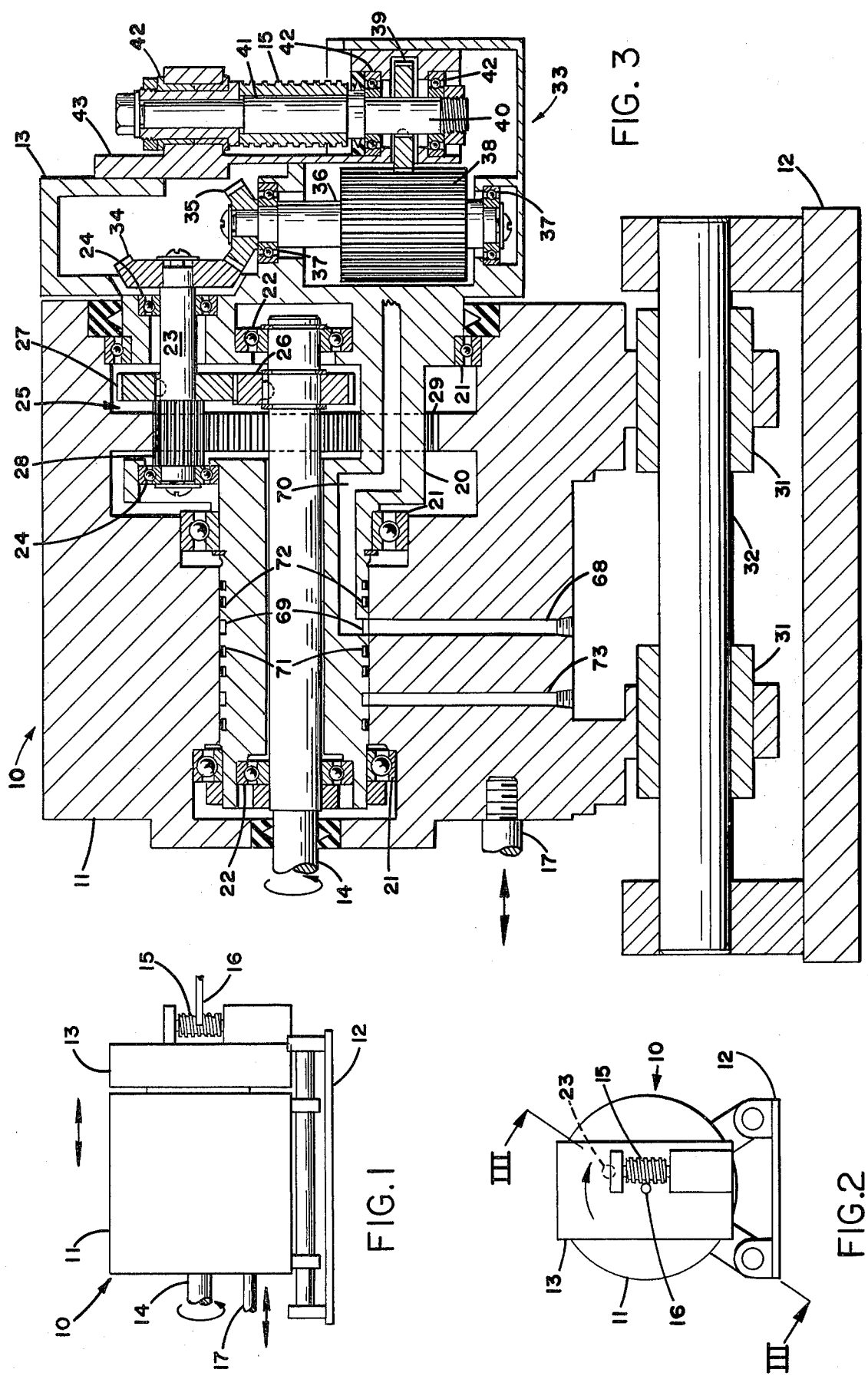

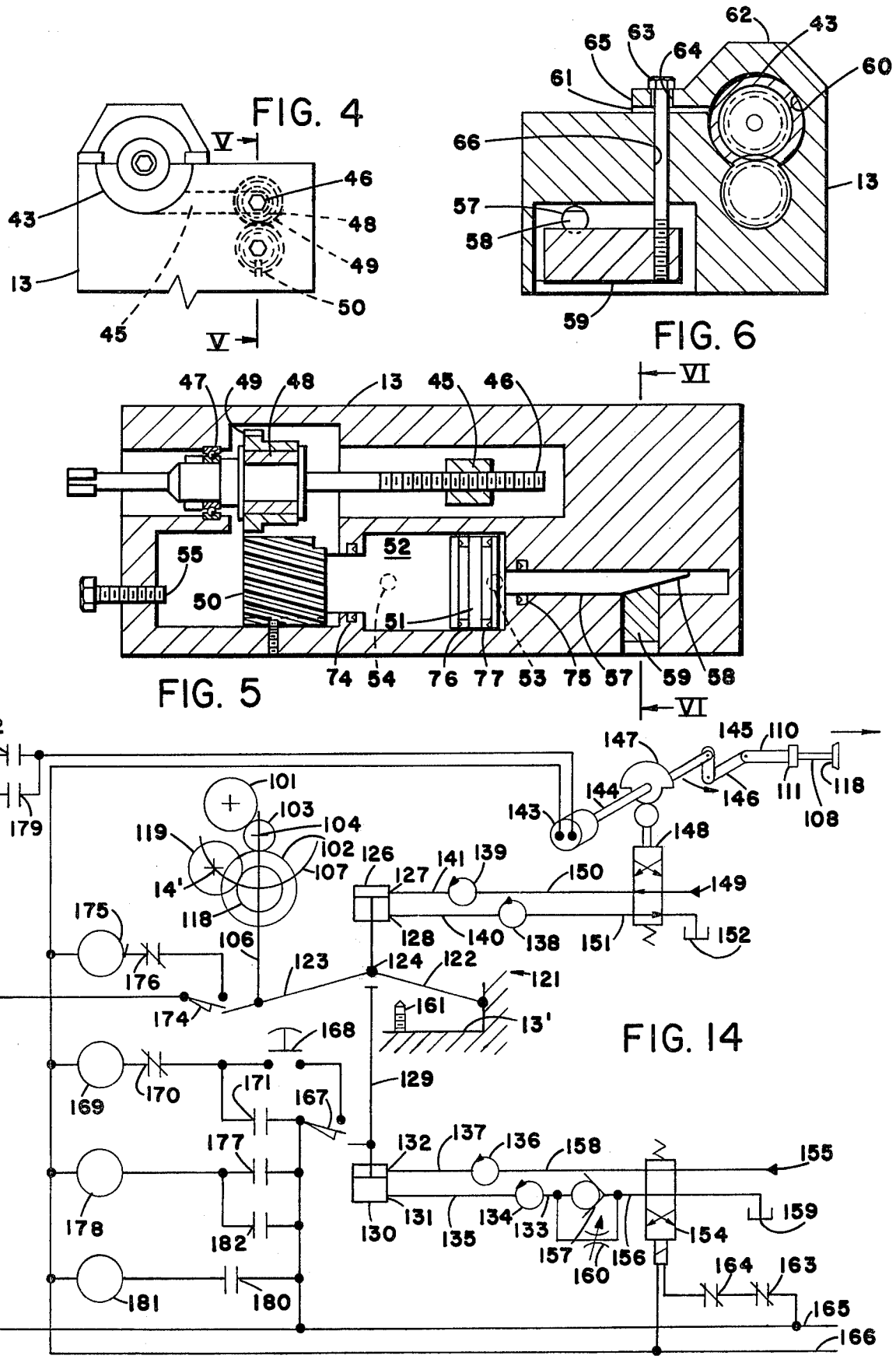

U.S. Patent  Jan. 24, 1984  Sheet 3 of 6  4,427,324
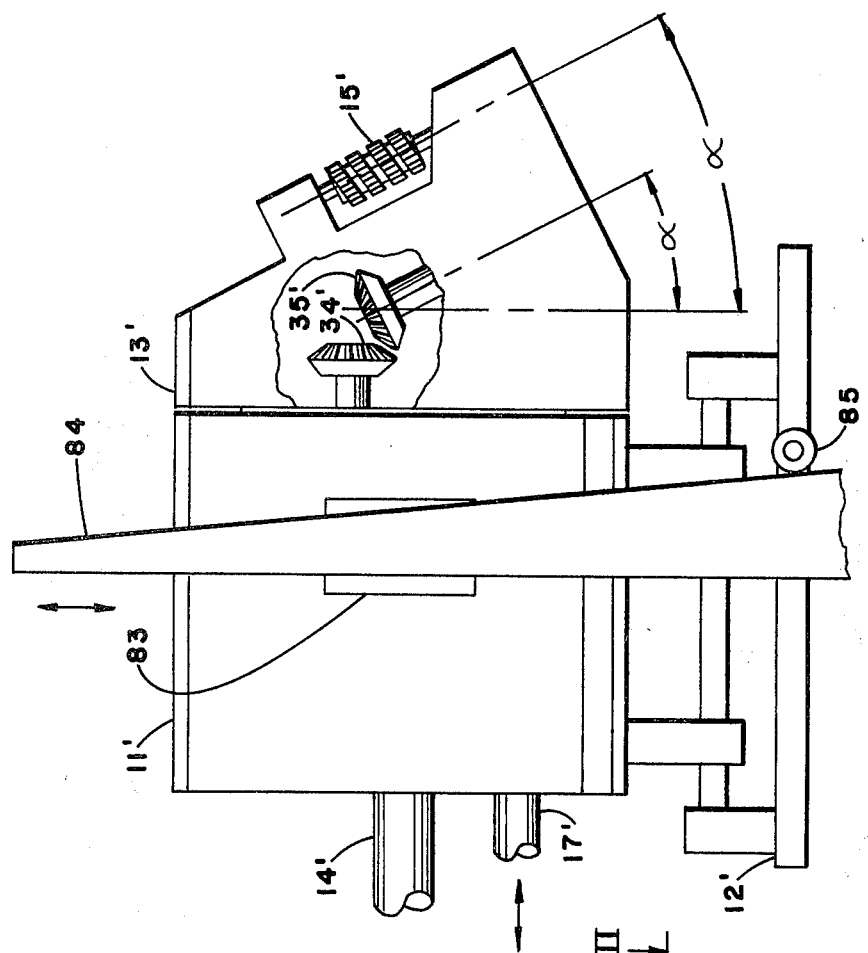
FIG. 9
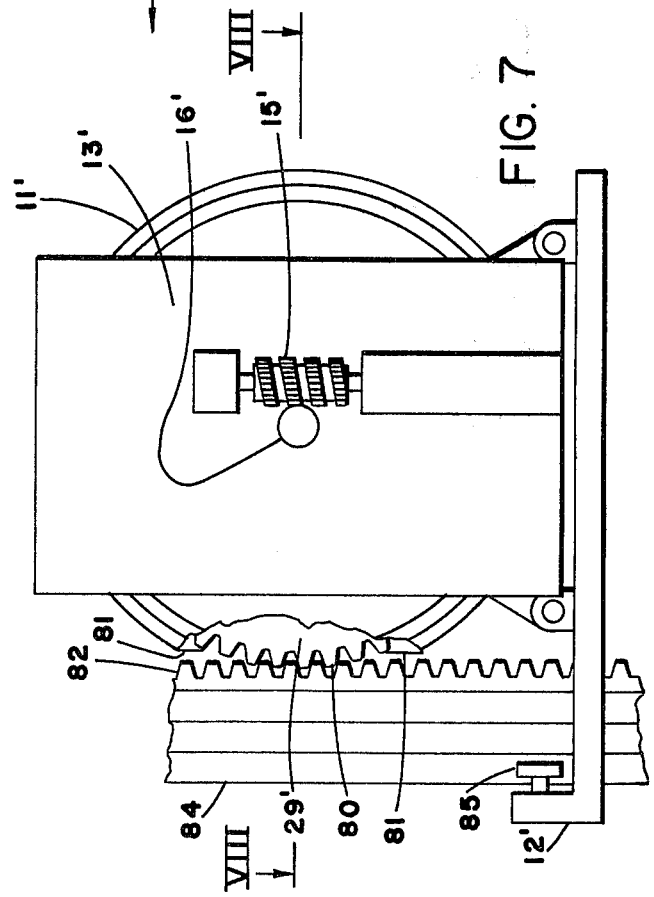
FIG. 7
FIG. 8
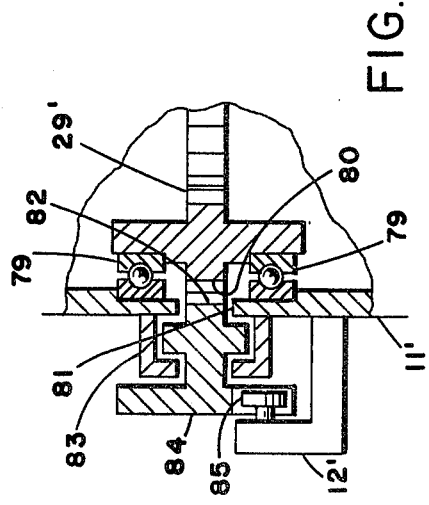

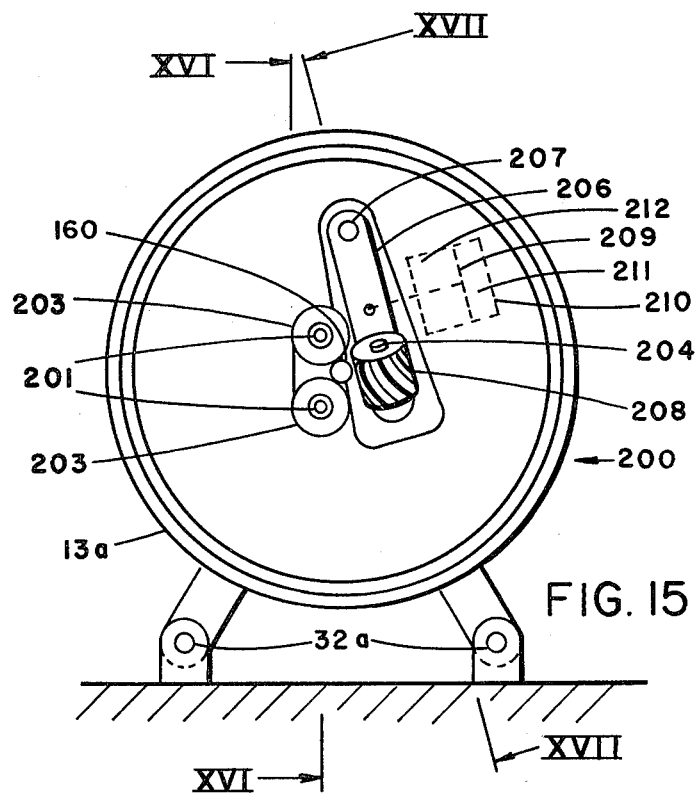
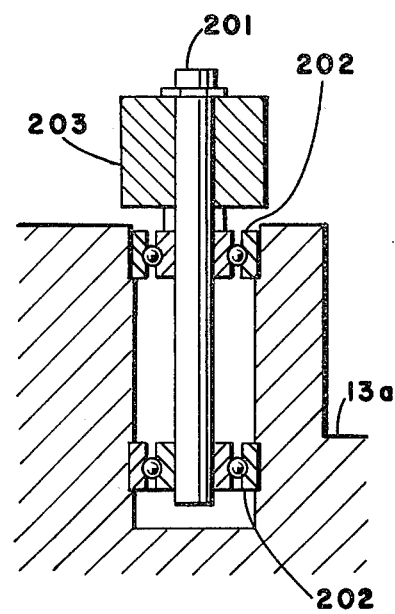
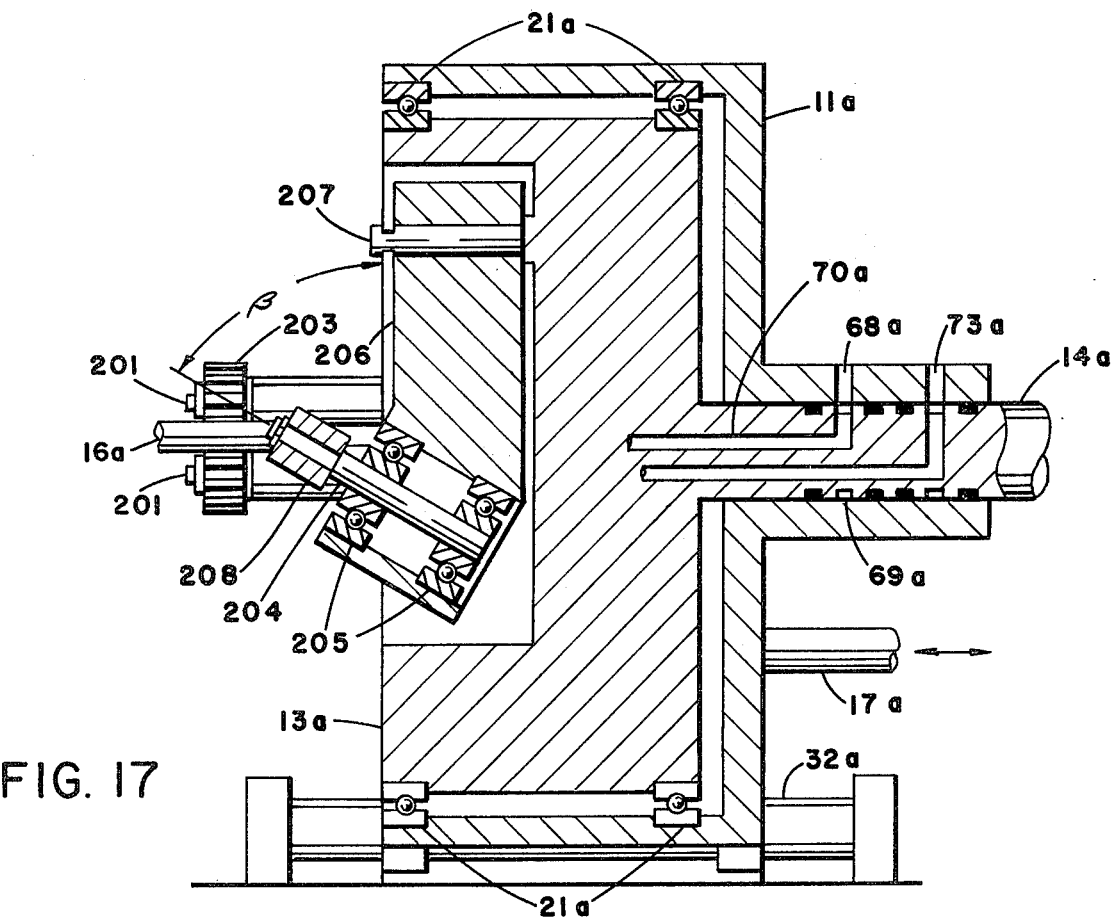
FIG. 15
FIG. 16
FIG. 17

METHOD OF SHAPE GENERATION BY ORBITING A ROTATING HOB

CROSS-REFERENCE TO A RELATED APPLICATION

This application is a continuation of application Ser. No. 041,680, filed May 23, 1979, now abandoned.

BACKGROUND OF THE INVENTION

This invention pertains to the generation of shapes on cylindrical workpieces.

In the past gears, splines, and the like have been generated while the workpiece was rotating. The workpiece was inserted into and removed from the workholder longitudinally. Such operations do not lend themselves to the application of transfer-machine processing of gear-like parts.

Shape generating machines, such as are used for hobbing, shaping and shawing are usually low production machines, adjustable to produce a wide variety of shapes and sized. As a result they are larger than necessary for many jobs.

SUMMARY OF THE INVENTION

According to this invention shapes may be generated on a non-rotating workpiece by orbiting a cutter around the workpiece as the cutter rotates about its axis to provide initial cutting or finishing operations. This sort of production lends itself to application of transfer-machine processing, because the workpiece may be gripped and released by a simple clamp. Scratching of the workpiece is reduced in this manner. For mass production, a dedicated machine can be built for generating s specific shape, thus making possible the building of a machine sized for that shape and no more. While this invention is particularly adaptable to generating small pinions on the ends of shafts, it is not limited to such usage.

BRIEF DESCRIPTION OF THE DRAWINGS

FIG. 1 is a side elevation of a hobbing machine according to this invention.

FIG. 2 is an end view of the machine in FIG. 1.

FIG. 3 is a cross-section of the machine taken substantially along the line III—III in FIG. 2, showing details of the construction.

FIG. 4 is a partial plan view of the hob head.

FIG. 5 is a cross-section of a portion of the hob head taken along the line V—V in FIG. 4.

FIG. 6 is a cross-section of a portion of the hob head taken along the line VI—VI in FIG. 5.

FIG. 7 is an end elevation (partially in section) of the end of a hobbing machine modified to generate helical shapes.

FIG. 8 is a partial sectional view taken along the line VIII—VIII in FIG. 7.

FIG. 9 is a side elevation of the hobbing machine in FIG. 8.

FIG. 14 is a schematic view of the infeed mechanism and controls employed in connection with the gear shaper in FIG. 10.

FIG. 15 is an end view of a shaving machine according to this invention.

FIG. 16 is a partial cross-section along line XVI—XVI in FIG. 12, showing the mounting for one of the shaving cutter supporting shafts.

FIG. 17 is a cross-section taken substantially along line XVII—XVII in FIG. 12.

DESCRIPTION OF THE PREFERRED METHODS

Figure 10:
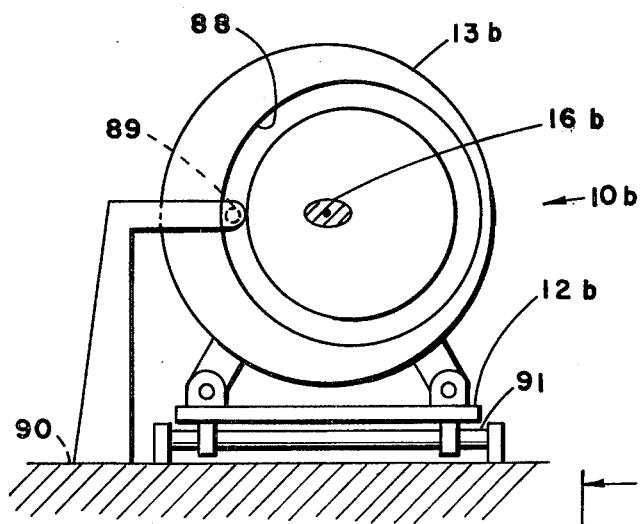
FIG. 10 is an elevation, partially in section, of a modification of the hobbing machine in FIG. 2.

According to this invention, a predetermined shape is generated on the periphery of a non-rotating workpiece by orbiting a rotatable cutter around the workpiece. The length of the generated shape is established by moving at least one of the cutter and workpiece lengthwise of the workpiece. A helical shape is generated by coordinating the orbiting and legnthwise movements such that the cutter follows a helical path with respect to the workpiece.

In some methods for generating shapes, such as by gear shaping, the cutter cuts while relatively moving in one direction lengthwise with respect to the workpiece in order to generate the desired shape, and must clear the workpiece while relatively moving in the opposite direction. This is accomplished by moving the cutter substantially radially into engagement with the workpiece while said relative lengthwise movement is in a shape generating direction and by moving the cutter away from the workpiece while the lengthwise movement is in the opposite direction.

In hobbing, the shape is generated by driving the rotatable cutter to rotate about an axis non-parallel to the axis about which the cutter orbits, and coordinating the rotating and orbiting of the cutter. The nature of this coordination is explained later in the description of a hobbing machine employing this method.

In gear shaping, the method comprises the steps of driving the rotatable cutter to rotate about an axis substantially parallel to the axis about which the cutter orbits, coordinating the rotating and orbiting of the cutter, and generating the shape by engaging the cutter with the workpiece while moving at least one of the cutter and the workpiece lengthwise in one direction with respect to the workpiece, and disengaging the cutter from the workpiece while the lengthwise movement is in the opposite direction.

In shaving, the shape is generated by allowing the cutter to rotate freely about an axis non-parallel to the axis of a partially formed workpiece such as to produce an axial component of movement of the cutter with respect to the workpiece, whereby a lengthwise shaving of the workpiece is produced.

DESCRIPTION OF THE PREFERRED EMBODIMENTS

FIGS. 1 and 2 show a hobbing machine 10 as an emplary embodiment of this invention. As shown, a casing 11 is movable longitudinally only with respect to a base 12. A hob head 13 rotatably supported in the casing, is rotated about its axis in response to rotation of a drive shaft 14. A cutter, in this example a hob 15, rotatably supported eccentrically on the hob head on an axis displaced from the hob head axis and in a plane intersecting the hob head axis, is rotated at a predetermined rotary speed ratio with respect to the hob head.

While a workpiece 16 is held in alignment with the axis of the hob head, the hob is rotated about its axis and is orbited around the workpiece by the hob head in response to rotation of the drive shaft, and is moved longitudinally along the workpiece as the casing is moved with respect to the base, as by an actuator 17.

Details of the preferred embodiment are shown in cross-section in FIG. 3. The hobbing machine 10 comprises a hob head 13 having at least a portion 20 thereof rotatably supported, as by bearings 21 in the non-rotatable casing 11. The drive shaft 14, concentric with the portion 20, is rotatably mounted in the hob head, as by bearings 22. A jack shaft 23, parallel to the drive shaft, is rotatably mounted on the hob head 13, as by bearings 24. A drive mechanism 25 (shown as comprising a spur gear 26 rotatable with the drive shaft and engaged with another spur gear 27 rottable with the jack shaft) drivingly couples the jack shaft to the drive shaft. A planet gear 28 integral with the jack shaft engages a sun gear 29 fixed concentric with the drive shaft 14 in the casing 11. It will be seen that, as the drive shaft rotates with respect to the casing, the jack shaft will be rotated about its axis by the interaction of the spur gears 26, 27 and will be orbited around the drive shaft by the interaction of the planet and sun gears 28, 29. Since the jack shaft is rotatably supported on the hob head 13, the hob head will be rotated about the drive shaft within the casing. The casing 11 is movable linearly back and forth in the axial direction of the hob head 13, as by the actuator 17, on followers 31 (shown as linear bearings) engaged with guides 32 on the base 12.

In a hobbing machine, as in FIG. 3, there is a positive drive 33 between the jack shaft 23 and the arbor 41. A bevel gear 34 is fixed on the jack shaft 23 for rotation thereby. Another bevel gear 35, engaged with bevel gear 34, rotates a transmission shaft 36, which is rotatably mounted on the hob head 13, as by bearings 37. Rotatable with the transmission shaft is a drive gear 38. Engaging the drive gear is a driven gear 39 fixed on an output shaft 40, a portion of which comprises a hob arbor 41. The output shaft is rotatably supported, as by bearings 42, on a hob slide 43, movable linearly back and forth on the hob head 13 in the axial direction of the output shaft. The hob slide 43 is so located on the hob head that the axis of output shaft 40 and hob arbor 41 is displaced from the axis of the drive shaft 14. The amount of this displacement is chosen such that a hob 15 mounted on the arbor 41 will generate the desired shape on the periphery of the workpiece 16 concentric with the axis of the hob head 13. In this manner the hob arbor 41 and any hob 15 thereon is orbited around the axis of the hob head 13 while being rotated by the output shaft. The ratios of gears 28 to 29, 34 to 35 and 38 to 39 will be chosen for example such that, for each orbit of a single thread gear hob around the workpiece, the number of revolutions of the hob will be equal to the number of teeth on a gear generated thereby. The linear motion of the casing 11 with respect to the base 12 need not be synchronized with either the rotating or orbiting of the hob arbor 41 and any hob 15 thereon. It merely advances the hob into cutting position, determines the length of the shape being generated on the workpiece 16, and withdraws the hob from the workpiece.

In order to even the wear on the hob 15, to extend the useful life of the hob, and incidentally reduce the number of times it must be replaced, provision is made for moving the hob longitudinally on its axis. It is to this end that the output shaft 40 is supported on the hob slide 43 rather than being driven directly by the bevel gear 35, as can be done. The drive gear 38 is elongated so that the driven gear 39 remains in engagement therewith throughout the longitudinal movement of the hob. Such longitudinal movement could be accomplished manually, or by any other means, but, as shown in FIGS. 4 and 5, it is accomplished by hydraulic means. A hob slide nut 45, rigidly affixed to the hob slide 43, engages a threaded shaft 46, rotatably mounted on the hob head 13, as by bearing 47, and turned in one direction only through an over-running clutch 48 in response to rotation of a gear 49. The gear engages a non-rotatable helical spline 50, movable axially by a hydraulic piston 51 reciprocable in a cylinder 52 in the hob head 13 in response to hydraulic fluid introduced alternatively through ports 53, 54. It will be seen that, as fluid is introduced through port 53, the piston 51 will be moved to the left as seen in FIG. 5, carrying the helical spline 50 with it. Since the spline is non-rotatable, the gear 49 will be rotated in response to the axial movement of the spline. When the gear is rotated by the leftward movement of the spline, the gear is coupled to the threaded shaft 46, thereby rotating the threaded shaft and causing the hob slide nut 45 to move to the left along the threaded shaft. Since the hob slide nut is rigidly affixed to the hob slide 43, the entire hob slide is moved upward, as seen in FIG. 3. When fluid is introduced through port 54, the piston 51 will be moved to the right, carrying the non-rotatable spline 50 with it. The rightward movement of the spline causes the gear 49 to reverse its direction of rotation, thus allowing the clutch 48 to slip and the threaded shaft 46 to remain stationary. This causes the hob slide 43 to maintain its position on the hob head 13. The hob slide therefore is progressively stepped, as seen in FIG. 3, upon each introduction of fluid through port 53. The distance of each step is determined by the position of an adjustable stop 55, which limits the stroke of the piston 51 and normally prevents the spline 50 from being disengaged from gear 49. When the hob 15 has been used over its full length and needs to be replaced or removed for sharpening, the stop 55 is backed off and fluid is introduced through the port 53 to move the non-rotatable spline 50 out of engagement with gear 49. The threaded shaft 46 is rotated manually in the direction causing the hob slide nut 45 to move to the right, which rightward movement is continued until the beginning end of a replacement hob is reached. Fluid is then introduced at port 54 to reengage the non-rotatable spline 50 with the gear 49, and the stop 55 is readjusted to limit the stroke of the piston 51, after which the stepping of a replacement hob may be begun.

The piston 51 is normally at the right end of the cylinder 52, as shown in FIG. 5. In order to prevent unwanted axial movement of the hob 15 resulting from backlash in the system and possible slippage of the clutch 48 while the piston is in said normal position, the hob slide is clamped in a fixed position on the hob head 13 during such time. As best seen in FIG. 5, a piston rod 57 extends axially from piston 51. On the end of the piston rod is a tapered cam 58 in contact with a cam-follower 59. At the section shown in FIG. 6, the hob slide 43 has a cylindrical cross-section, which is slidable lengthwise in a split cylinder 60 formed in the hob head 13 by an axial slot 61, such that there is a resilient cantilevered wall 62. A bolt 63 is passed loosely through a hole 64 in a flange 65 on the free end of the cantilevered wall 62, guided for longitudinal motion by bore 66, and adjustably threaded into cam-follower 59. When the piston 51 is in its normal position to the right as seen in FIG. 5, the cam-follower will be held down by the cam 58. This draws down the flange 65, partially closing the slot 61, and pulling the resilient wall 62 tightly against the hob slide 43, thereby clamping the hob slide in its then location. When the piston begins to move to the left to step the hob slide upward, the cam permits the resilient wall 62 to release the hob slide for the stepping longitudinal motion thereof.

The hydraulic fluid introduced into the cylinder 52 through port 53 is delivered through bore 68 in casing 11, an annular groove 69 around portion 20 of the hob head 13, and a conduit 70 more or less lengthwise through the hob head to the port 53. The fluid is prevented from escaping between portion 20 and the casing 11 by rotary seals 71, 72 on opposite sides of the groove. In a similar manner fluid is delivered from bore 73 to port 53. Dynamic seals 74, 75 prevent escape of fluid from the cylinder 52, while piston rings 76, 77 prevent fluid flow pas the piston 51.

A rotary drive motor may be conveniently mounted on the casing 11 and coupled to the drive shaft 17, as by a belt and sheaves, a chain and sprockets, or by a toothed belt and gears. It could also be directly coupled in alignment with the drive shaft, as by a rigid connection, or by splines permitting relative axial motion. The actuator 17 could be a hydraulic or pneumatic piston in cylinder type linear actuator, a rotary motor supplying linear motion through a screw and nut arrangement, cam and follower, or the like. Instead of using a linear actuator 17, the workpiece 16 could be reciprocated. By use of a hollow drive shaft 17 and providing a passage through the hob head 13 in alignment with the drive shaft, the workpiece could pass through the machine, permitting generation of forms of any length. Since the rotary and reciprocatory motions need not be coordinated and there are no unusual requirements for providing them, they have not been shown or described.

FIGS. 7-9 show a modification of the rotary hob head, by which helical shapes can be generated. As shown, the apparatus is the same as in FIGS. 1-6, except as described hereafter. For corresponding parts the same reference numerals have been employed, but identified by a prime ('). The sun gear 29' is rotatable within the casing 11, as in bearings 79, such that the speed of orbiting of the hob 15' about the workpiece is increased or decreased by rotation of the sun gear, although the rotational speed of drive shaft 14' remains constant. Rotation of the sun gear is made possible by a shifting gear 80 formed on the sun gear and meshed through a slot 81 with a rack 82 movable tangentially in a fixed path with respect to the casing 11', as determined by a guide 83. A linear rise cam 84, the rise of which may be made adjustable in any well-known manner, is movable with the rack. A follower 85 in fixed relation to the base 12', when in engagement with the cam, causes the casing 11' to move axially upon tangential movement of the rack. The axial movement, being proportional to the tangential movement, which, in turn, is proportional to the increased or decreased orbital speed of the hob 15', produces the desired helical movement of the hob.

As shown in FIG. 8, the rack 82 and cam 84 are moved vertically, by any suitable means (not shown), such that, as the cam is moved downward, the casing 11' is moved forward (to the right as seen in FIG. 9) by force applied by the actuator 17. This advances the hob into the workpiece. When the cam is moved upward, the casing is moved backward (to the left as seen in FIG. 9) in opposition to the force applied by the actuator. In doing so, the hob is made to retrace its helical orbit with respect to the workpiece. For rapid traverse when the hob is not cutting the workpiece, the actuator may pull the casing rapidly backward, thus separating the cam from the follower, and may push the casing rapidly forward until the cam contacts the follower.

In order to provide the proper cutting relationship of the hob 15' to the workpiece 16' during generation of the helical shape, the hob is tipped from a plane perpendicular to the axis of the workpiece by a swivel angle $\alpha$, which is dependent upon the helix angle to be generated, and the lead angle on the hob. The swivel angle is produced, as by changing the angles of the bevel gears 34', 35', such that the drive mechanism beyond the bevel gears is tipped at the desired swivel angle $\alpha$. This produces the same angle $\alpha$ at the hob. The angle of the rise in cam 84 corresponds to the swivel angle. By moving the workpiece and any of the cutter, the head, or the entire machine, laterally (usually radially with respect to the workpiece) it is possible to produce shapes generated around a non-cylindrical shape, such as a cone, or shapes having cross-sections generated from a non-circular base line, such as an ellipse.

FIG. 10 shows an actuator for moving the cutter as by a cam 88 affixed to the head 13b of a hobbing machine and engaging follower 89 freely rotatable in fixed location on a subbase 90, whereby base 12b and the entire hobbing machine 10b is moved radially with respect to the workpiece 16b along guides 91 on the subbase in synchronism with rotation of the head, and therefore with the orbiting of the hob around the workpiece. By such means shapes having cross-sections generated upon non-circular base lines are produced.

Figure 11:
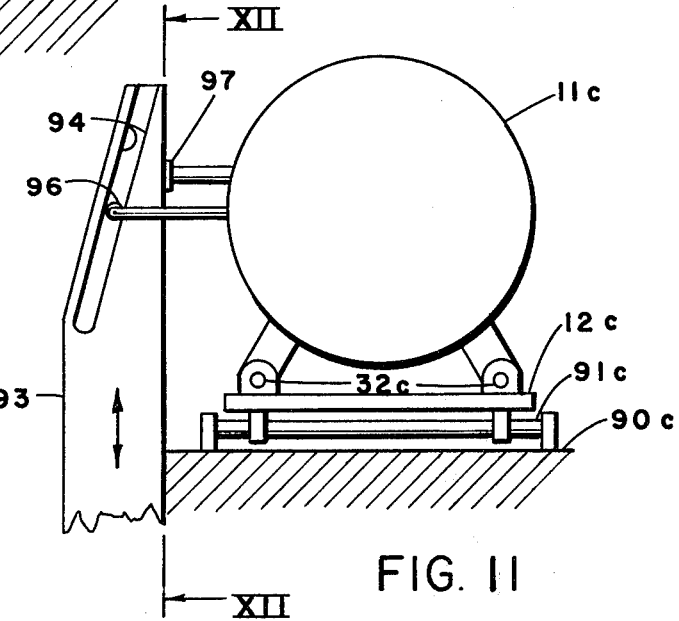
FIG. 11 is an end elevation of a generating machine modified to produce non-cylindrical shapes.
Figure 12:
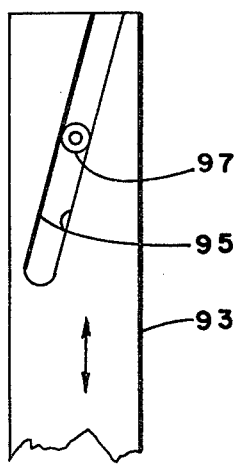
FIG. 12 is a partial view taken along line XII—XII of FIG. 11.

FIGS. 11, 12 show an actuator combining lateral and axial movement as a reciprocable member 93 having double-sided cams 94, 95 receiving followers 96, 97, rotatable in fixed locations on casing 11c, to provide lateral and axial motion thereto upon reciprocation of the member 93 by means not shown. In this manner the lateral and axial movements of the casing, and therefore of the hob or other cutting tool, can be synchronized to provide a conical or other non-cylindrical generated shape.

Figure 13:
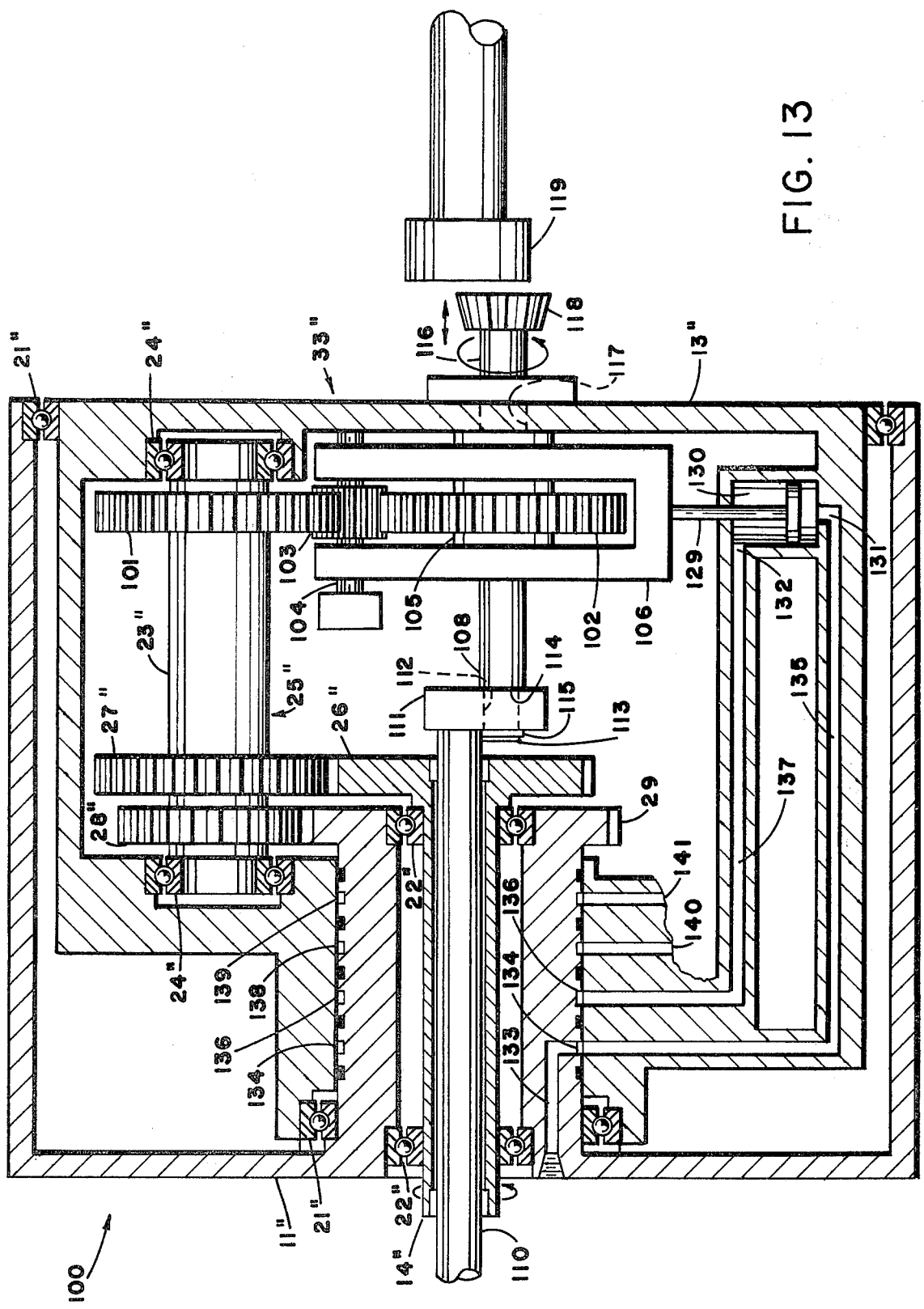
FIG. 13 is a longitudinal cross-section of a gear shaper according to this invention.

FIG. 13 shows how this invention can be applied to a gear shaper, which is not limited to the shaping of gears. The reference numerals employed for comparable parts are the same as those used for the hobbing machine in FIGS. 1-6, except for an added double prime (").

The gear shaper 100 has a stationary casing 11". A shaper head 13" is rotatably mounted in the casing, as by bearings 21". A hollow drive shaft 14" is rotatably supported in the casing 11", as by bearings 22". A jack shaft 23", parallel to the drive shaft, is rotatably supported on the shaper head, as by bearings 24". A drive mechanism 25" comprises a spur gear 26" rotatable with the drive shaft and engaged with another spur gear 27" for rotating the jack shaft, whereby the jack shaft is driven from the drive shaft. A planet gear 28", rotatable with the jack shaft, engages a sun gear 29" affixed to the casing, causing the shaper head to rotate in the casing when the drive shaft is rotated with respect to the casing. Except for the location of the sun gear, the construction so far has been similar to that of the hobbing machine. Now the construction changes. A drive gear 101 affixed to the jack shaft 23" drives the driven gear 102 through an idler 103, freely rotatable on a pivot shaft 104 located in fixed position parallel to the jack shaft on the shaper head 13". The driven gear 102 is fixed on a tube 105 rotatable in a U-shaped member 106. The open end of the U-shaped member straddles the idler and is pivoted for limited swinging on the pivot shaft 104. The axis of the tube is in a fixed spaced parallel relation to the pivot shaft, such that the arc 107 followed by the axis of the tube 105 passes through the axis of the hollow drive shaft 14". An output shaft 108 passes through the tube 105 and is rotated thereby, as through splines, or the like, (not shown) permitting closely guided axial reciprocation of the output shaft with respect to the tube. For shaping of helical work on a helical type spline or a helical key guide is used within tube 105 to impart an additional rotational motion to the shaper cutter as it reciprocates, thus producing helical teeth.

A rod 110, reciprocable in the hollow drive shaft 14", is engaged to reciprocate the output shaft 108. As shown, a block 111, rigid on the end of the rod, has a clearance slot, or other aperture, 112 therethrough, accepting and permitting lateral motion therein of a reduced diameter inner end 113 of the output shaft. The block is closely held between a shoulder 114 on the output shaft and a retaining ring 115 on the inner end. The outer end 116 of the output shaft passes through a clearance hole 117 in shaper head 13" and is adapted to have a shaper cutter 118 affixed thereon external to the casing. The cutter is therefore reciprocated with the rod 110. An outward movement of the cutter produces a cutting stroke with respect to a workpiece 119, fixed in a position concentric with the drive shaft 14". An inward movement of the cutter produces a return stroke with respect to the workpiece as seen in FIG. 10.

Provision must be made for the cutter to engage the workpiece during the cutting stroke and to clear the workpiece during the return stroke. To this end, as seen in FIG. 14, the U-shaped member 106 is swung on its pivot shaft 104 to move the cutter 118 along the arc 107 into the workpiece at the beginning of the cutting stroke and to move the cutter oppositely along the arc and out of engagement with the workpiece during the return stroke. This is accomplished by a toggle mechanism 121 comprising links 122, 123 pivotally connected at knee 124. The other end of link 122 is pivotally supported at a fixed location on the shaper head 13". The other end of link 123 is pivotally connected at a fixed location on the U-shaped member 102 such that, as the toggle is straightened by the application of force, the cutter 118 is moved into the workpiece 119, and, as the toggle is broken, the cutter is moved away from the workpiece. An infeed operator comprising a piston 125 in a double-acting infeed cylinder 126, forces the knee 124 toward locked position, thereby feeding the cutter into the workpiece, when hydraulic fluid enters the cylinder through a feed port 127. When hydraulic fluid enters the cylinder through a clear port 128, the cutter is moved to clear the workpiece. An infeed limiting piston 129, in a double-acting infeed limiting cylinder 130, acts as a stop on the movement of the knee toward locked position. Hydraulic fluid entering the cylinder through the control port 131 moves the piston rapidly upward to the maximum limiting position, which is the starting position of the cutter when the cutting cycle and radial infeed begin. As fluid is bled from the infeed limiting cylinder through the control port the depth of successive cuts is increased. Fluid enters and leaves the cylinder 130 through port 132 inversely with respect to the control port 131 to provide positive control over the position of the infeed limiting piston 129. Because the toggle mechanism 121 must be mounted upon the rotating shaper head 13", a rotary manifold must be provided. As shown in FIG. 13, a bore 133 in the stationary casing 11' leads to an annular groove 134, which is intersected by a channel 135 communicating with control port 131. Another similar bore (not shown) leads to another annular groove 136, which is intersected by another channel 137 communicating with port 132. In like manner, other bores (not shown) lead to annular grooves 138, 139 intersected by channels 140, 141 communicating with the clear port 128 and feed port 127, respectively. In this manner hydraulic fluid is conducted between an external stationary supply and the cylinders 126 and 130 on the rotating shaper head 13".

In a gear shaper the infeed and clearance of the cutter must be synchronized with the beginnings of the cutting and return strokes respectively. The strokes of the cutter 118 are determined by a motor 143, which rotates a shaft 144, having a crank arm 145 on its end. A rigid link 146 is pivotally connected to the free end of the crank arm and to the rod 110, such that the rod is reciprocated in the hollow drive shaft 14" in synchronism with rotation of the motor. A cam 147 fixed on the shaft 144 operates a two position four-way valve 148, such that the valve is in normal position during the cutting stroke of the cutter, as shown in FIG. 11, and in actuated position during the return stroke. At the beginning of the cutting stroke, before the cutter enters the workpiece, hydraulic fluid flows from an hydraulic fluid source 149, through the valve 148 and conduit 150 into the annular groove 139, and thence through channel 141 and feed port 127 into the infeed cylinder 126 to move the piston 125 to straighten the toggle mechanism 121 and thus cause the U-shaped member 106 to pivot around the fixed shaft 104 and so feed the cutter 118 into the workpiece 119. During downward movement of the infeed piston, hydraulic fluid leaves the cylinder through the clear port 128, passing through channel 140 into the annular groove 138, and thence through a conduit 151 and valve 148 to a sump 152. The distance that the cutter moves into the workpiece is limited by the infeed limiting piston 129, as will be explained later. When the return stroke begins, the cam 147 operates the valve, moving it to actuated position. Fluid then flows from source 149 through the valve 148 and conduit 151 into the annular groove 138, and thence through channel 140 and clear port 128 into cylinder 126, causing piston 125 to move the toggle mechanism 121 away from a locked toggle position and thus cause the U-shaped member 106 to clear the cutter from the workpiece during the return stroke. During movement of the piston to provide clearance, hydraulic fluid flows from the infeed cylinder 126 through feed port 127 and channel 141 into the annular groove 139, and thence through conduit 150 and the valve 148 into the sump 152.

The distance that the cutter moves into the workpiece is determined by the infeed limiting piston 129. When a new workpiece 119 is to be shaped, a two position four-way valve 154 is moved to actuated position, permitting hydraulic fluid from a source 155 to flow through a conduit 156, an open check valve 157 and bore 133 into the annular groove 134, and thence through channel 135 and control port 131 into the infeed limiting cylinder 130, thereby moving the piston 129 into the most restrictive infeed limiting position. During this time, fluid flows from the cylinder 130 through port 132 and channel 137 into annular groove 136, and thence through conduit 158 and valve 154 into a sump 159. After the piston reaches its most restrictive position, the valve 154 is returned to its normal position, as shown in FIG. 14. Fluid then flows from the source 155 through valve 154 and conduit 158 into the annular groove 136, and thence through channel 137 and port 132 into the cylinder 130 to bias the infeed limiting piston toward progressively less restrictive positions. Movement of the piston toward less restrictive positions is limited by the rate of flow of fluid from the cylinder through the control port 131. Since the pressure at control port 131 exceeds the pressure at the sump 159, the check valve 157 is now closed, prohibiting flow therethrough. The check valve is by-passed by a variable restrictor 160, which permits a limited rate of flow of fluid from the cylinder 130 through control port 131 and channel 135 into the annular groove 134, and thence through bore 133, the restrictor 160, conduit 156 and valve 154 into the sump 159. By adjusting the restriction, the rate of feed, and therefore the depth of cut, of the cutter may be set at any desired value. An adjustable stop 161 prevents infeed of the cutter into the workpiece beyond a preset distance, determined by the shape being produced. After further infeed has been prevented by the stop, the orbiting of the cutter around the workpiece must continue until a complete orbit has been made after the stop initially prevented further infeed. As shown in FIG. 14, this is accomplished electrically, but equivalent hydraulic, pneumatic and mechanical controls could be substituted.

As shown in FIG. 14, the solenoid operated valve 154 is initially serially connected through normally-closed relay contacts 163 and 164 between electric lines 165, 166 to energize the valve, whereby the valve moves to actuated position. As a result, the piston 129 moves upward to a preset maximum position determined by the maximum radial dimension of the workpiece. As the piston reaches its maximum position, it closes a normally-open limit switch 167. When it is desired to commence reciprocation of the cutter 118, a normally-open manually operated switch 168 is closed, energizing a relay 169 through the limit switch, the manually operated switch and normally closed timer contacts 170. Upon energization of the relay, normally-open relay contacts 171 are closed, bypassing the limit switch and manually operated switch and thereby locking-in the relay. At the same time normally-open relay contacts 172 are closed by relay 169 to energize the motor 143 and so beginning reciprocation of the cutter. The relay also opens the normally-closed relay contacts 163, thereby breaking the circuit to the valve 154 and thus permitting the valve to assume its normal position, whereby infeed of the cutter begins. Just before the toggle mechanism 121 reaches the limit of its travel, as determined by the stop 161, it engages and closes a normally-open limit switch 174 to energize a relay 175 through normally-closed timer contacts 176. Energization of relay 175 closes normally-open relay contacts 177 to complete a circuit to energize a relay 178. The energized relay 178 closes normally-open relay contacts 179 to maintain energization of motor 143 and reciprocation of the cutter 118, opens normally-closed relay contacts 164 to maintain deenergization of valve 154, closes normally-open relay contacts 180 to start the timer 181, and opens normally-closed relay contacts 170, to deenergize relay 169, which in turn opens relay contacts 171 and 172, and closes contacts 163. Since contacts 179 are closed directly by relay 178 and contacts 172 are opened indirectly through relay 169, the contacts 179 close before contacts 172 open. When relay 169 is deenergized, contacts 171 open, and, since the piston 129 is in a low position at this time, the limit switch 167 is also open, leaving the control for relay 169 in its initial condition. Shortly after timing starts, normally-open timer contacts 182, paralleling contacts 177, are closed, after which normally-closed timer contacts 176 are opened to deenergize relay 175. Although deenergization of relay 175 opens relay contacts 177, relay 178 is maintained energized through the now closed timer contacts 182. When relay 169 is deenergized, its contacts 163 close, setting up a circuit to reenergize valve 154 upon subsequent closure of relay contacts 164. After the cutter 118 has made at least one complete orbit around the workpiece 119, the timer 181 opens timer contacts 182 to deenergize relay 178, which, in turn, opens relay contacts 180 to deenergize and reset the timer. Upon deenergization of the timer, contacts 182 open, breaking the circuit through relay 178, which allows contacts 179 to open and stop rotation of the motor 143 and reciprocation of the cutter, and allows contacts 164 to close, thus restoring the entire control to its initial condition. The timer could be a digital counter receiving signals originated by revolution of the head.

Another species, as shown in FIGS. 15-17 is a shaving machine. Once again corresponding parts are identified by the same reference numerals as in FIGS. 1-6, but with the addition of an "a". In the shaving machine 200 there are two shafts 201 mounted, as by bearings 202, for free rotation about their axes parallel to the axis of and in a fixed position on the shaving head 13a, such that rollers 203 fixed on the shafts support the workpiece 16a during the shaving operation. Another shaft 204 is mounted, as by bearings 205 for free rotation in a fixed position on a movable support, shown as an arm 206 movable about a pivot 207, on the shaving head. A shaving cutter 208 is affixed to shaft 204 for rotation therewith. In shaving position the rollers 203 and cutter 208 are angularly spaced substantially equally around the axis of the shaving head and workpiece 16a, with cutter 208 movable laterally in a substantially radial path thereto. Shaft 204 lies in a plane parallel to the axis of the head 13a and passing through the pivot 207, forming an angle $\beta$ with respect to the head. The angle $\beta$ will depend upon the lead angle of the shaving cutter 208 and the helix angle on the workpiece 16a. The arm 206 is moved toward and away from the workpiece, as by an operator comprising a piston 209 in an hydraulic cylinder 210 mounted on the shaving head 13a.

The shaving head 13a is rotatable in the casing 11a, as in bearings 21a, by a shaft 14a coupled to a rotary power source (not shown). The non-rotatable casing is mounted for reciprocation, as by actuator 17a, on guides 32a. Hydraulic fluid is conducted to and from an infeed end 211 of the cylinder 210, as through bore 68a, annular groove 69a and conduit 70a, and to the relief end 212 of the cylinder in like manner, with the external connection being made at bore 73a.

The arm 206 is normally biased away from the workpiece 16a. When a workpiece is being shaved, the arm is moved relatively slowly toward the workpiece such that the shaving cutter 208 is pressed against the workpiece as the shaving head 13a revolves, thus producing the shaving action. When shaving is completed, the arm is moved rapidly away from the workpiece. While shaving is proceeding, actuator 17a moves the shaving head forward relatively slowly. When shaving is completed the actuator moves the shaving head backward, such that the shaving cutters clear the workpiece. The shaving head may be rotated continuously at any desired speed.

It will be obvious to those skilled in the art that many equivalent constructions and controls are possible in the use of this invention. It is also possible to combine the disclosed features of different embodiments in a single embodiment. The embodiments disclosed herein are merely examples.

We claim:

1. A method of generating a plurality of separate teeth of gears, splines or the like spaced about the periphery of a non-rotating workpiece having a lengthwise axis, utilizing a hob mounted for rotation and for orbital movement, and a planetary drive for rotating and for orbiting said hob, including a drive shaft, a planet gear and sun gear engaged with said planet gear, a drive mechanism coupling said drive shaft to rotate said planet gear and orbit said planet gear around said drive shaft by interaction of the planet and sun gears, and a mechanical drive coupling said planet gear to rotate said hob about its axis and to orbit said hob around said drive shaft, said method comprising the steps of:

positioning said workpiece, said hob and said planetary drive to align said workpiece axis and said drive shaft and to orient said hob eccentrically of and with its axis in a plane laterally displaced from and transverse to said workpiece axis;

rotating said drive shaft to rotate said hob and orbit said hob about said workpiece axis;

coordinating the rotary and orbital speeds of said hob according to a predetermined speed ratio established by said planetary drive such that for each orbit of said hob around said workpiece, said hob rotates a plurality of revolutions determined by the number of teeth spaced about the periphery and generated thereby; and moving said hob and workpiece relatively lengthwise of said workpiece to engage said hob and said workpiece and generate on the periphery a plurality of separate teeth shapes which are conjugate to said hob during shape generation.

2. A method of generating a plurality of separate teeth of gears, splines or the like spaced about the periphery of a non-rotating workpiece having a lengthwise axis, utilizing a hob head revolvable about a head axis intersecting said head, a hob rotatably supported on said head and a drive connected to revolve said head and rotate said hob, said method comprising the steps of:

positioning said workpiece, said hob head and said hob to orient said hob eccentrically of and with its axis in a plane laterally displaced from and transverse to said head axis and to align said workpiece axis and said head axis;

rotating said hob and orbiting said hob about said workpiece by revolving said hob head about said head axis while rotating said hob;

coordinating the rotary and orbital speeds of said hob according to a predetermined speed ratio established by said drive such that for each orbit of said hob around said workpiece, said hob rotates a plurality of revolutions determined by the number of teeth spaced about the periphery and generated thereby; and moving said hob and workpiece relatively lengthwise of said workpiece to engage said hob and said workpiece and generate on the periphery a plurality of separate teeth shapes which are conjugate to said hob during shape generation.

3. A method according to claim 1 or 2 wherein the orbital and rotary speeds of the hob are coordinated such that for each orbit the number of revolutions of the hob will be equal to the number of teeth spaced about the periphery and generated thereby divided by the number of threads of the hob.

4. A method according to claim 1 or 2 further comprising rotating the hob about an axis in a plane substantially perpendicular to the axis of the workpiece.

5. A method according to claim 1 or 2 further comprising rotating the hob about an axis offset from a plane perpendicular to the axis of the workpiece by a swivel angle which is dependent upon a helix angle of the teeth to be generated and the lead angle of the threads on the hob.

6. A method according to claim 1 or 2 further comprising coordinating the lengthwise movement with said orbiting such that said hob follows a helical path with respect to the workpiece.

7. A method according to claim 1 or 2 further comprising moving said hob substantially radially with respect to the workpiece and coordinating the radial movement with said orbiting such that a cross section of the shape is generated from a non-circular base line.

8. A method according to claim 1 or 2 further comprising moving said hob substantially radially with respect to the workpiece and coordinating the radial movement with said lengthwise movement such that a shape is generated around a non-cylindrical shape.

* * * * *